United States Patent [19]
Smith

[11] Patent Number: 5,289,298
[45] Date of Patent: Feb. 22, 1994

[54] MULTIPLEX GRATING HOLOGRAPHIC FLOODLIT CENTER HIGH MOUNTED STOPLIGHT

[75] Inventor: Ronald T. Smith, Torrance, Calif.

[73] Assignee: Hughes Aircraft Company, Los Angeles, Calif.

[21] Appl. No.: 995,116

[22] Filed: Dec. 22, 1992

[51] Int. Cl.⁵ .......................... G02B 5/32; G03H 1/26
[52] U.S. Cl. ........................................ 359/14; 359/20; 359/22; 359/25
[58] Field of Search .................. 359/13, 14, 15, 19, 359/20, 22, 25

[56] References Cited

U.S. PATENT DOCUMENTS

| | | | |
|---|---|---|---|
| 3,637,307 | 1/1972 | Spitz | 359/20 |
| 3,658,403 | 4/1972 | Greenaway et al. | 359/20 |
| 3,752,555 | 8/1973 | Klotz | 359/25 |
| 3,941,450 | 3/1976 | Spitz et al. | 359/25 |
| 5,186,533 | 2/1993 | Hori | 359/25 |

*Primary Examiner*—Martin Lerner
*Attorney, Agent, or Firm*—L. A. Alkov; W. K. Denson-Low

[57] ABSTRACT

A hologram structure for use in a holographic center high mounted stoplight system for a vehicle. The hologram structure includes a hologram layer having a plurality of single grating holograms formed in therein, each single grating hologram configured to diffract light at a respective predetermined angle.

8 Claims, 4 Drawing Sheets

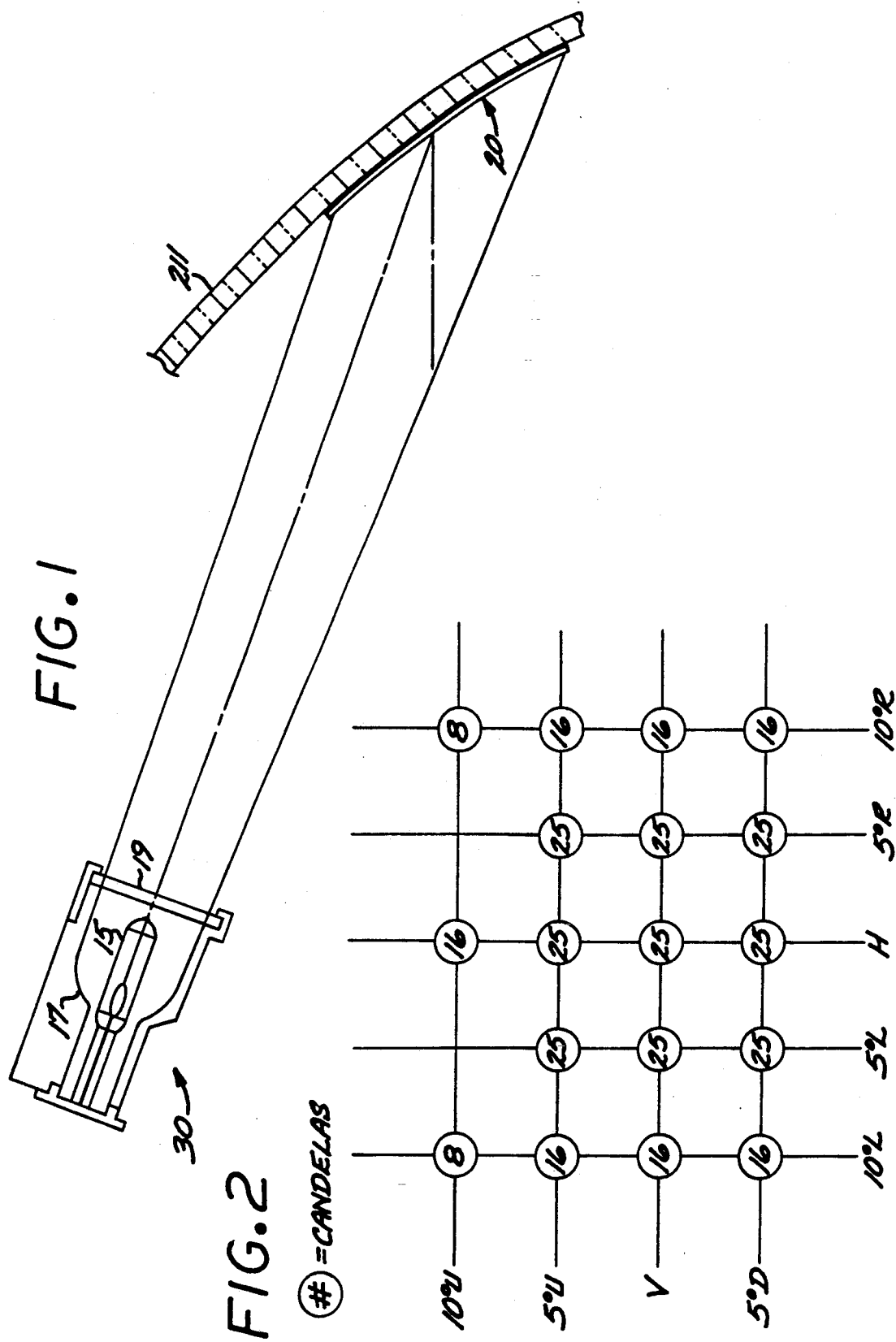

MULTIPLEX GRATING HOLOGRAPHIC FLOODLIT CENTER HIGH MOUNTED STOPLIGHT

BACKGROUND OF THE INVENTION

The disclosed invention is directed generally to holograms for center high mounted stoplights for vehicles, and more particularly to a hologram that efficiently meets the required brightness and angular coverage and to an exposure technique for recording such hologram.

Present federal regulations require center high mounted stoplights (CHMSLs) in addition to the standard stoplights mounted in the rear portion of an automobile. The high mounted stoplights are intended to maximize the visibility of the automobile braking indicators to drivers following the braking vehicle, and are commonly mounted on the rear window of an automobile.

High mounted stoplights have commonly been implemented as a standard lenticular lens, a red filter, an illuminating incandescent bulb, and a reflector enclosed in a housing that is typically secured adjacent the top or bottom of an automobile rear window. However, the bulky housing partially obscures the rearward vision of the driver, and moreover imposes limitations on the design of the automobile.

Center high mounted stoplights have been also integrated into automobile body parts such as rear decks, spoilers, roofs, which to some degree substantially reduce or remove the rearward vision problem. However, such stoplights are complex and may impose limitations on the design of the automobile.

Holographic center high mounted stoplights have also been developed in order to efficiently meet the stoplight regulations. A consideration with holograms for holographic center high mounted stoplights are the luminous intensity and angular coverage requirements. Such requirements generally include a quantitative aspect that defines luminous intensity over a defined solid angular range, and a qualitative aspect that requires visibility over a horizontal angular range that is greater than the horizontal component of the defined solid angular range. Essentially, the regulations require a brighter region generally in the center of the angular region of coverage.

A straightforward procedure for recording a hologram for a center high mounted stoplight would be to record the image of a lenticular lens array that spreads light uniformly over a selected angular coverage (e.g., two lenticular arrays rotated 90 degrees with respect to each other and laminated together). A consideration with this procedure, however, includes the generation of spurious holograms since the lenses of the array would cover overlapping areas. Such spurious holograms reduce the efficiency of the desired stoplight hologram and moreover limit the see through clarity of the hologram. Also, precise control of the direction of the diffracted light is difficult.

SUMMARY OF THE INVENTION

It would therefore be an advantage to provide a holographic center high mounted stoplight that efficiently provides the desired luminous intensity distribution without excessive spurious holograms.

Another advantage would be to provide a holographic center high mounted stoplight wherein the direction of diffraction can be precisely controlled.

The foregoing and other advantages are provided by the invention in a holographic center high mounted stoplight system that includes a hologram layer having a plurality of single grating holograms formed in therein, each single grating hologram configured to diffract light at a respective predetermined angle; and a playback source that provides playback illumination having angular spread such that each single grating hologram diffracts light over a solid angular region.

BRIEF DESCRIPTION OF THE DRAWINGS

The advantages and features of the disclosed invention will readily be appreciated by persons skilled in the art from the following detailed description when read in conjunction with the drawing wherein:

FIG. 1 sets forth a schematic sectional view illustrating a vehicle center high mounted stop light installation employing a hologram constructed in accordance with the invention.

FIG. 2 sets forth a luminous intensity distribution graph depicting present vertical and horizontal requirements in candelas for center high mounted stoplights.

DETAILED DESCRIPTION OF THE DISCLOSURE

Figure 3:
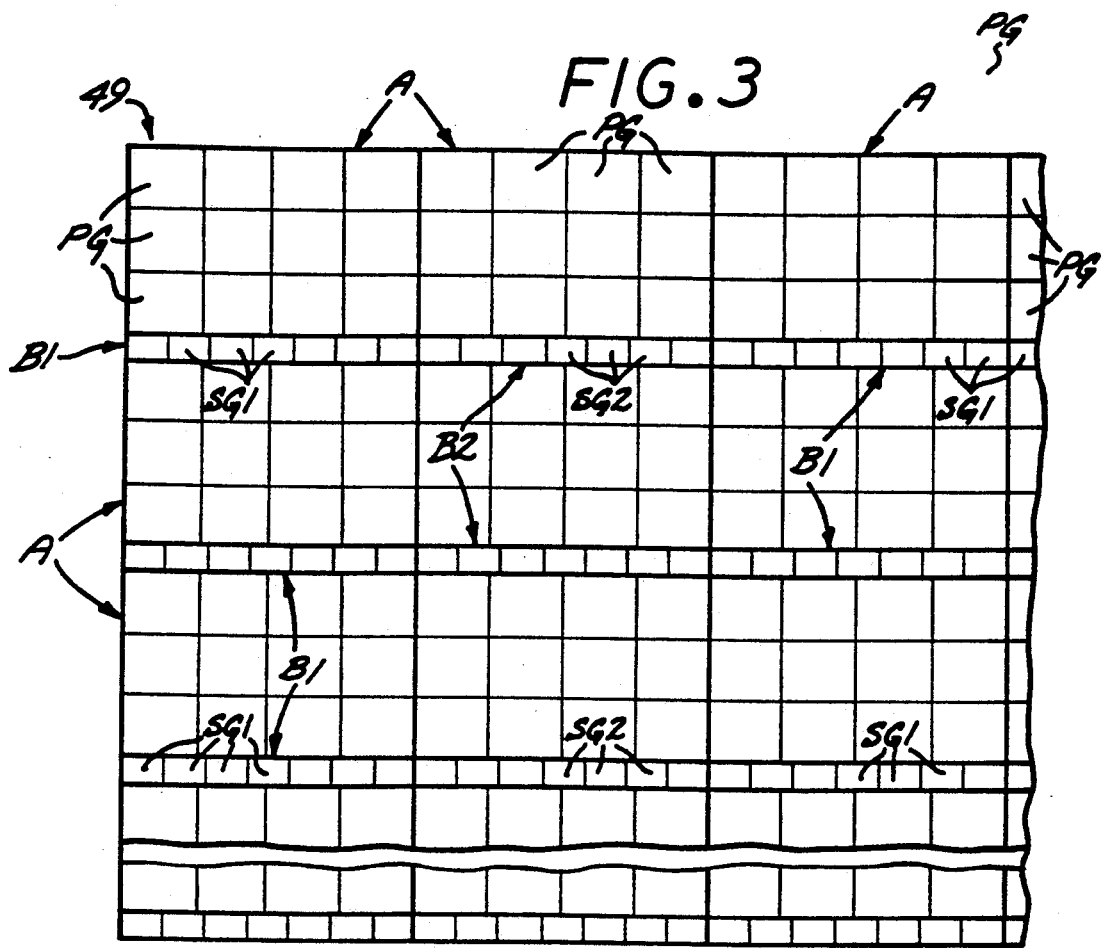
FIG. 3 schematically illustrates a planar CHMSL hologram having a plurality of primary hologram blocks and a plurality of secondary hologram blocks in accordance with the invention.

In the following detailed description and in the several figures of the drawing, like elements are identified with like reference numerals.

Referring now to FIG. 1, shown therein is a center high mounted stoplight system which includes a hologram assembly 20 and an illumination source 30. The hologram assembly 20, which includes a volume transmission hologram described further herein, is secured to the inside surface of an automobile rear window 211, and is substantially transparent to the rearward vision of the driver. The illumination source 30 is mounted forward of the hologram assembly 20 and out of the rearward viewing angle of the driver, for example, adjacent the inside of the roof of the automobile, and illuminates the volume hologram of the hologram assembly 20 with a diverging beam.

The volume hologram of the hologram assembly is constructed to provide, when illuminated by the illumination source 30, an appropriate image that is visible from behind the automobile over the appropriate vertical and horizontal viewing angles.

The illumination source 30 includes an incandescent lamp 15, such as a quartz halogen bulb, a parabolic reflector 17 that generally confines the illumination to the hologram assembly 20, and a high pass filter 19 having a cutoff wavelength of about 600 nanometers (nm). As a result of the wavelength dependent sensitivity of human vision, the image provided by the hologram of the hologram assembly will be perceived as red, with the apparent peak intensity being somewhere between about 600 and 620 nm. The incandescent lamp 15 is connected to the brake light actuating circuit of the automobile so as to be energized when the brake pedal is depressed.

Referring now to FIG. 2, set forth therein is a graph showing the luminous intensity (in candelas) versus angular field requirements for a CHMSL for the field defined as (a) 10 degrees up and 5 degrees down relative to a central horizontal plane that passes through the center of the CHMSL, and (b) 10 degrees left and right relative to a central vertical plane that passes through the center of the CHMSL and contains the longitudinal axis of the vehicle, as set forth in Federal Motor Vehicle Safety Standards No. 108. The numbers in the graph identify the minimum luminous intensities at those angular locations in candelas, and the entire angular field is subject to a 160 candela maximum at any given angular position.

In addition to the foregoing quantitative requirements, there is the qualitative requirement that the stoplight be visible within the central horizontal plane over a range of 45 degrees on either side of the central vertical plane (i.e., two horizontal angular regions that are mirror images of each other). By way of example, this qualitative requirement can be interpreted as requiring a luminous intensity of about 1 candela.

Referring now to FIG. 3, schematically illustrated therein is a view of a planar CHMSL hologram 49 in accordance with the invention prior to installation in the hologram assembly, with the surface shown being the surface that will face the outside of the vehicle when installed. The CHMSL hologram 49 comprises rows of identically sized primary hologram blocks A alternatingly and non-overlappingly interleaved with rows of identically sized secondary hologram blocks B1 and B2 (collectively hologram blocks B). Each row of hologram blocks A includes non-overlapping primary hologram blocks A, while each row of hologram blocks B includes secondary hologram blocks B1 alternatingly interleaved with secondary hologram blocks B2 arranged side-by-side in a non-overlapping manner.

By way of reference, the first row of hologram blocks A is the top of the CHMSL hologram 49 as it is positioned in the installed hologram assembly of the CHMSL system, whereby each row of holograms blocks is generally aligned with the horizontal. Consistently with such orientation, the parallel edges of a block that are generally aligned with the horizontal when installed in the vehicle shall be called the top and bottom edges wherein the top edge is closest to the top of the figure and is closest to the top of the rear window when installed. Also, the parallel edges of a hologram block that are perpendicular to the top and bottom edges shall be referred to as the side edges. The width of a hologram block is measured along the top or bottom edge, while the height of a hologram block is measured along either of the side edges. In the particular example of FIG. 3, each of the hologram blocks A and the hologram blocks B have the same width, but the hologram blocks B are much shorter in height.

The primary hologram blocks A are configured to diffract stoplight illumination to meet the Federal requirements of luminous intensity within the required central region of 10° left to 10° right in the horizontal and 5° to 10° up in the vertical such that diffracted stoplight illumination is visible at all angular positions with such required central region, while the secondary hologram blocks B are configured to diffract stoplight illumination to meet the requirement of peripheral horizontal coverage beyond the central region to 45° left and 45° right of center such that diffracted stoplight illumination is visible at all angular positions within the required peripheral horizontal regions.

The hologram blocks A cover a larger area than the hologram blocks B, and the ratio of total areas is determined on the basis of the desired distribution of light between the hologram blocks A and the hologram blocks B which can be determined, for example, as follows. The luminous intensity required for the secondary hologram blocks B is about 1/10 of the luminous intensity required for the primary hologram blocks A. The solid angular coverage of the primary hologram blocks A is about 25 degrees by 25 degrees while the solid angular coverage of the secondary hologram blocks B is a total of about 80 degrees by 6 degrees. Assuming an average luminous intensity of about 22 candelas for the primary hologram blocks A, multiplying the solid angular coverage of the hologram blocks A by the average luminous intensity of 22 provides an illumination factor of 13,750 for the primary hologram blocks A. Assuming an average luminous intensity of about 2.2 candelas for the secondary hologram blocks B, multiplying the solid angular coverage by the average luminous intensity of 2.2 candelas provides an illumination factor of 1056 for the secondary hologram blocks B. Thus, the area of the primary hologram blocks should be about 13 times as large as the area of the secondary cells. For the particular example of FIG. 3, there is a one-to-one correspondence between primary hologram blocks A and secondary hologram blocks B, each hologram block A should be about 13 times as big as each hologram block B, and since hologram blocks A and the hologram blocks B have the same width, the height of the hologram blocks B should be about 1/13 the height of the hologram blocks A.

Effectively, the hologram of FIG. 3 comprises three arrays that are interleaved: an array of primary hologram blocks A, an array of secondary hologram blocks B1, and an array of hologram blocks B2. All hologram blocks A are of the same size, and are arranged in a rectilinear pattern wherein the hologram blocks A in each row are contiguous and the rows are separated by identical spacing. All hologram blocks B are of the size, and thus the hologram blocks B1 are arranged in a rectilinear pattern wherein the hologram blocks B1 in each row are spaced by identical spacing, and the rows are separated by identical spacing. Similarly, the hologram blocks B2 are arranged in a rectilinear pattern wherein the hologram blocks B2 in each row are spaced by identical spacing, and the rows are separated by identical spacing. More particularly, the spacing between hologram blocks B1 is the same as the spacing between the hologram blocks B2.

Figure 4:
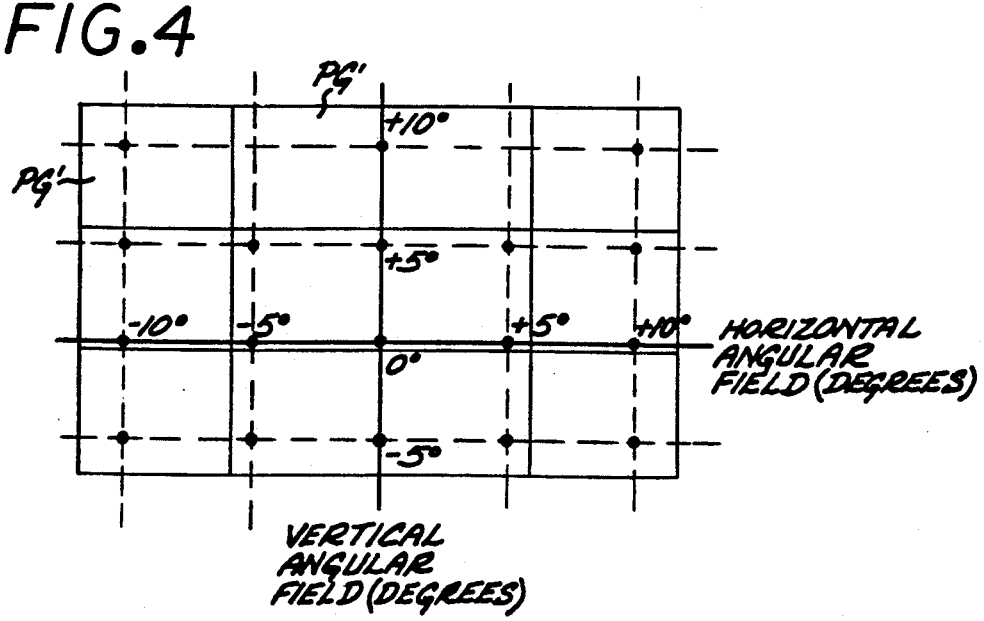
FIG. 4 schematically illustrates the respective solid angular regions of diffraction of the single grating hologram cells of each of the primary hologram blocks of the hologram of FIG. 3.

In accordance with the invention, each hologram block A comprises a 2-dimensional array of non-overlapping single grating hologram cells PG, as schematically illustrated in FIG. 3. Each single grating hologram cell PG is configured to diffract light within a predetermined angular region PG' within the required central region as shown in FIG. 4. In particular, each single grating hologram cell PG is recorded to diffract light at only one particular angle, but actually diffracts light over an entire solid angular region PG' as a result of the angular spread of the playback illumination source which is not a perfect point source. Each single grating hologram cell PG within each hologram block A diffracts light into a different solid angular region PG', such that the aggregate of diffracted light from all single grating hologram cells PG within each hologram block A entirely fills the required central angular region, as shown in FIG. 4. Essentially, the hologram cells of each hologram block A and the angular spread of the playback source cooperate to diffract light into an array of different angular regions which together provide diffracted stoplight illumination at all angular positions within the required central region. Thus, the number of hologram cells required for each hologram block A as well as the diffraction angles of the different cells will depend on the angular spread of the particular playback source with which the CHMSL is to be utilized. For reference, the angular coordinate system included in FIG. 4 includes solid dots at the angular positions as to which the output of the CHMSL hologram must meet a specific luminous intensity requirement.

By way of illustrative example, the single grating hologram cells PG may be arranged within each hologram block A in a pattern which is analogous to the pattern of diffracted solid angular regions PG' in angular space, as shown in FIGS. 3 and 4. However, the single grating cells PG can be arranged in other patterns while maintaining the same pattern of diffracted solid angular regions PG' in angular space.

Figure 5:
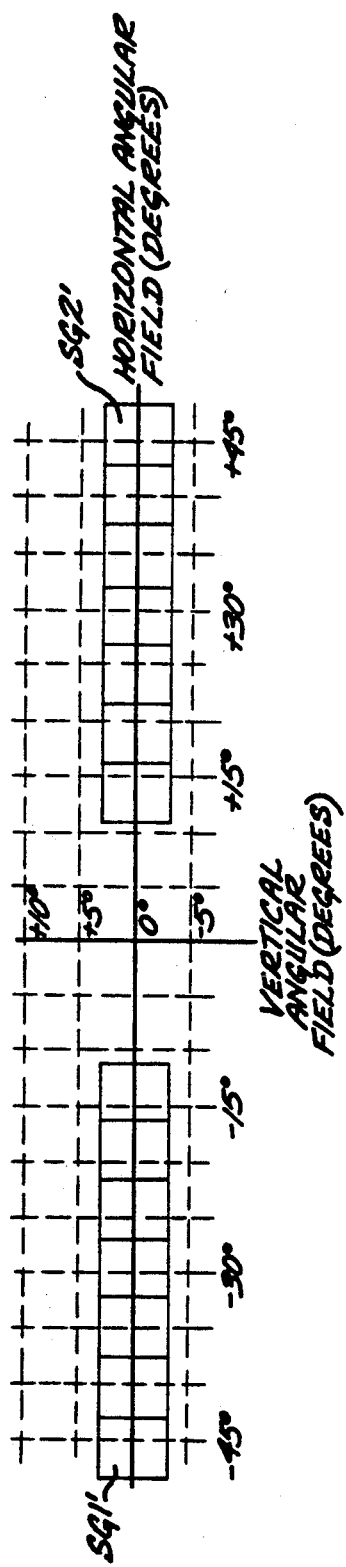
FIG. 5 schematically illustrates the respective solid angular regions of diffraction of the single grating hologram cells of each of the secondary hologram blocks of the hologram of FIG. 3.

As to the secondary hologram blocks B, each hologram block B1 is configured to diffract stoplight illumination into the horizontal peripheral angular field that is to the left of the central region, while each hologram block B2 is configured to diffract stoplight illumination into the horizontal peripheral angular field that is to the right of the central region. Each of the blocks B1 comprises a 1-dimensional horizontal array of single grating hologram cells SG1, as schematically illustrated in FIG. 3. Each single grating hologram cell SG1 is configured to diffract light within a predetermined solid angular region SG1' within the required left horizontal peripheral angular region, as shown in FIG. 5. In particular, each single grating hologram cell SG1 is recorded to diffract light at only one particular angle, but actually diffracts light over a solid angular region SG1' as a result of the angular spread of the playback illumination source which is not a perfect point source. Each single grating hologram cell SG1 within each hologram block B1 diffracts light in a different solid angular region SG1', such that the aggregate of diffracted light from all single grating hologram cells SG1 within each single grating hologram block B1 entirely fills the required left horizontal peripheral angular region, as shown in FIG. 5. Essentially, the hologram cells SG1 of each hologram block B1 and the angular spread of the playback source cooperate to diffract light into an array of different angular regions which together provide diffracted stoplight illumination at all angular positions within the required left horizontal peripheral angular region. Thus, the number of hologram cells required for each hologram block B1 as well as the diffraction angles of the different cells will depend on the angular spread of the particular playback source with which the CHMSL is to be utilized. By way of illustrative example, as shown in FIG. 5, the single grating hologram cells SG1 cover an angular region that is between (a) about 10 degrees left of the central vertical plane and (b) about 50 degrees left of the central vertical plane, and between (a) about 3 degrees up from the central horizontal plane and (b) about 3 degrees down from the central horizontal plane.

By way of illustrative example, the single grating hologram cells SG1 may be arranged within each hologram block B1 in a pattern that is analogous to the pattern of diffracted solid angular regions SG1' in angular space, as shown in FIGS. 3 and 5. However, the single grating cells SG1 can be arranged in other patterns while maintaining the same pattern of diffracted solid angular regions SG1' in angular space.

Similarly to the secondary blocks B1, each secondary block B2 comprises a 1-dimensional horizontal array of single grating hologram cells SG2, as illustrated in FIG. 3. Each single grating hologram cell SG2 is configured to diffract light within a predetermined solid angular region SG2' within the required right horizontal peripheral angular region, as shown in FIG. 5. In particular, each single grating hologram cell SG2 is recorded to diffract light at only one particular angle, but actually diffracts light over a solid angular region SG2' as a result of the angular spread of the playback illumination source which is not a perfect point source. Each single grating hologram cell SG2 within each hologram block B2 diffracts light in a different solid angular region SG2', such that the aggregate of diffracted light from all single grating hologram cells SG2 within each hologram block B2 entirely fills the required right horizontal peripheral angular region, as shown in FIG. 5. Essentially, the hologram cells SG2 of each hologram block B2 and the angular spread of the playback source cooperate to diffract light into an array of different angular regions which together provide diffracted stoplight illumination at all angular positions within the required left horizontal peripheral angular region. Thus, the number of hologram cells required for each hologram block B2 as well as the diffraction angles of the different cells will depend on the angular spread of the particular playback source with which the CHMSL is to be utilized. By way of illustrative example, each secondary hologram block B2 is the same size as each secondary hologram block B1, and the number of hologram cells SG2 in each secondary hologram block B2 is the same as the number of hologram cells SG1 in each secondary hologram block B1. Also by way of illustrative example, the diffraction angles of the hologram cells SG2 of each secondary hologram block B2 are mirror images, across the central vertical plane, of the diffraction angles of the hologram cells SG1 of the secondary hologram blocks B1.

By way of illustrative example, the single grating hologram cells SG2 may be arranged within each hologram block B2 in a pattern that is analogous to the pattern of diffracted solid angular regions SG2' in angular space, as shown in FIGS. 3 and 5. However, the single grating cells SG2 can be arranged in other patterns while maintaining the same pattern of diffracted solid angular regions SG2' in angular space.

Figure 8:
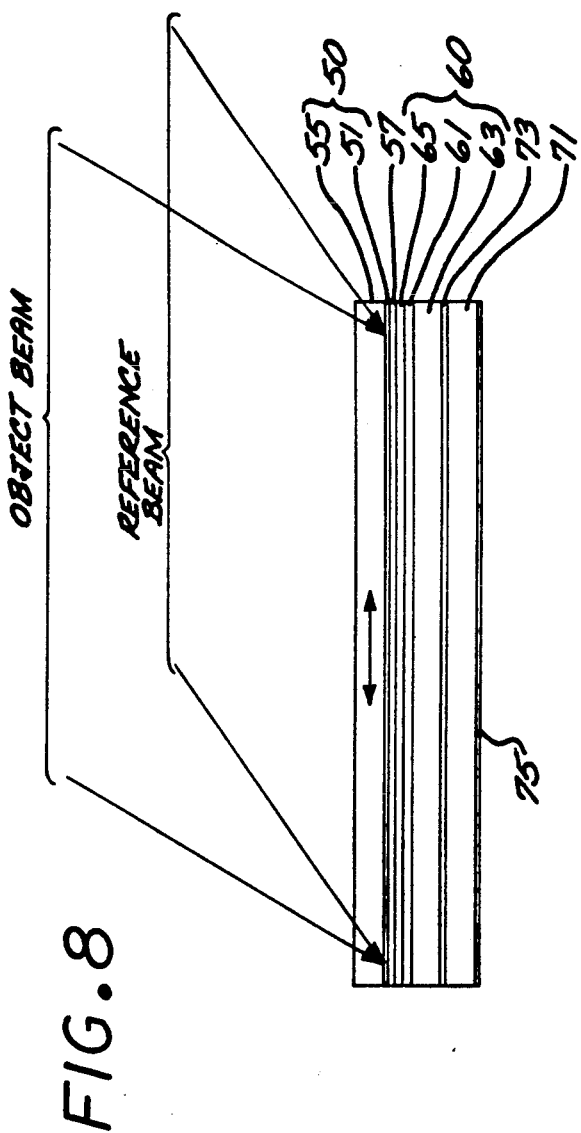
FIG. 8 sets forth by way of illustrative example an exposure system for constructing the single grating hologram cells of the CHMSL hologram of FIG. 3.

Referring now to FIG. 8, set forth therein by way of illustrative example is an exposure system for recording a CHMSL hologram in accordance with the invention pursuant to a sequence of exposures to expose the hologram blocks A, a sequence of exposures to expose the hologram blocks B1, and a sequence of exposures to expose the hologram blocks B2. A holographic recording assembly 60, which is comprised of a holographic recording 61 layer disposed on a glass substrate 63 and covered by a thin cover layer 65, is disposed beneath an exposure mask assembly 50, which is comprised of a mask 51 having mask openings and a mask supporting substrate 55. The hologram recording assembly 60 and the exposure mask assembly 50 are oriented with the exposure mask 51 and the thin cover layer 65 facing each other, and are separated by a very thin layer of index matching fluid 57 which also fills in the mask openings of the mask 51. Hologram recording illumination passes through the mask substrate, the mask openings, the index matching fluid, and the thin cover layer to the holographic recording layer. By way of illustrative example, the exposure mask assembly 50 is movable, for example by a computer driven micrometer, such that hologram forming cells that correspond to the hologram cells of the CHMSL hologram can be selectively positioned beneath the mask openings for exposure. To reduce reflections that would cause construction of spurious holograms, a light absorptive glass layer 71 that absorbs light of the color used for the reference and construction beams is located beneath the substrate 63 of the recording assembly 60 and is optically coupled thereto by a thin layer of index matching fluid 73. A light absorbing black paint layer 75 is disposed on the lower side of the glass layer 71.

Figure 6:
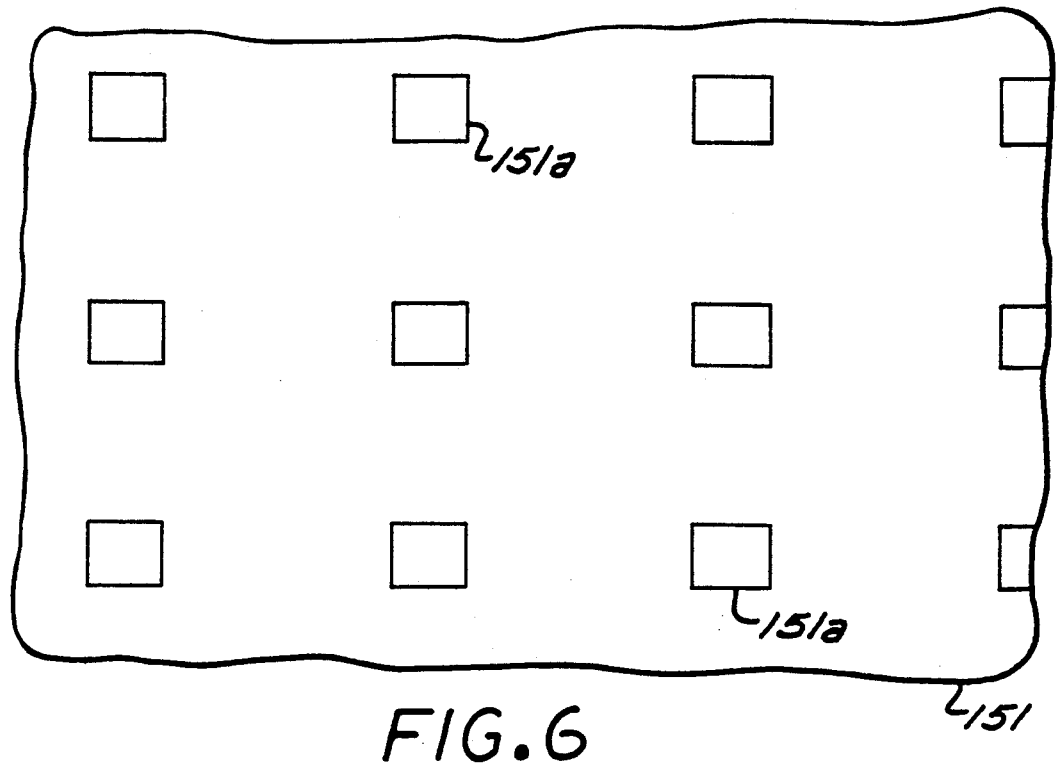
FIG. 6 schematically illustrates a mask that is utilized for constructing the single grating hologram cells of the first hologram blocks of the CHMSL hologram of FIG. 3.

As to construction of the hologram blocks A, the exposure mask 51 in particular comprises a mask 151, schematically illustrated in FIG. 6, having mask openings 151a which leave uncovered each cell of each hologram block A that is in the same cell position, whereby all hologram cells located at the same location in all hologram blocks A are exposed at the same time. It should be appreciated that the number of mask openings 151 is equal to the number of hologram blocks A, that the size of each mask opening 151a corresponds to the hologram cell size, that the horizontal center-to-center spacing between mask openings 151a corresponds to the horizontal center-to-center spacing between the hologram blocks A, and that the vertical center-to-center spacing between mask openings 151a corresponds to the vertical center-to-center spacing between the hologram blocks A. The different cells would be exposed by appropriately positioning the mask openings over the cell position intended to be exposed in a particular exposure.

Figure 7:
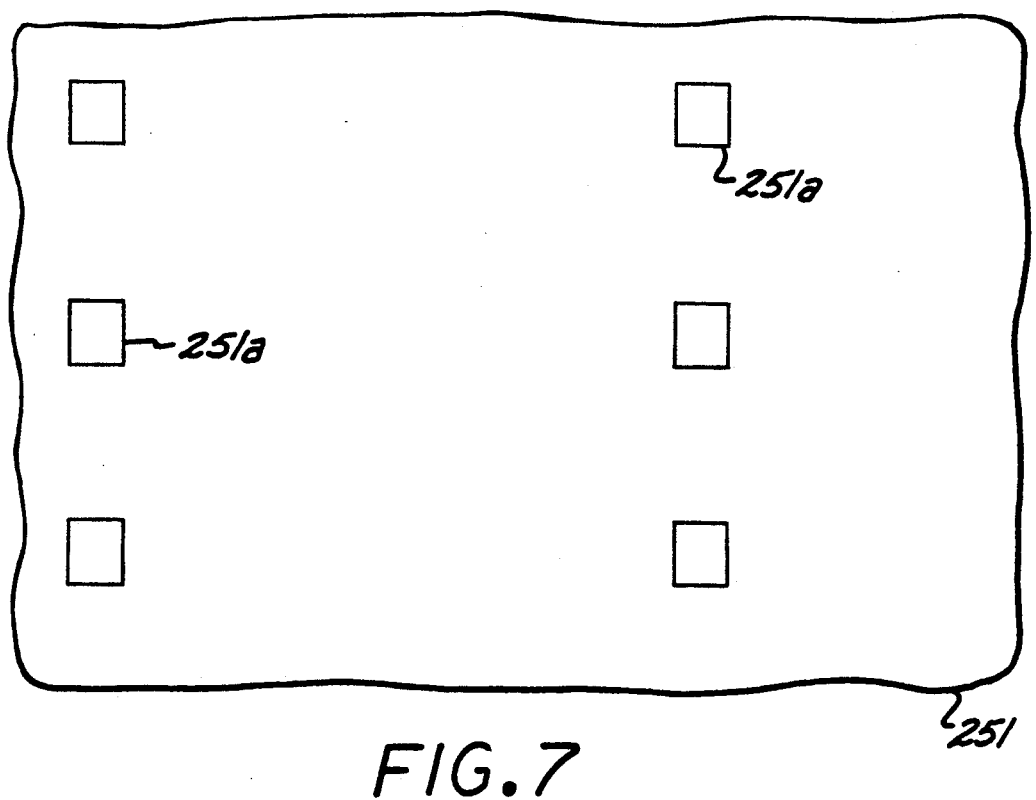
FIG. 7 schematically illustrates a mask that is utilized for constructing the single grating hologram cells of the second hologram blocks of the CHMSL hologram of FIG. 3.

As to the construction of the hologram blocks B1, the exposure mask 51 in particular comprises a mask 251, schematically illustrated in FIG. 7, having mask openings 251a which leave uncovered each cell of each hologram block B1 that is in the same cell position, whereby all hologram cells located at the same location in all hologram blocks B1 are exposed at the same time. It should be appreciated that the number of mask openings 251a is equal to the number of hologram blocks B1, that the size of each mask opening corresponds to the hologram cell size, that the horizontal center-to-center spacing between mask openings 251a corresponds to the horizontal center-to-center spacing between the hologram blocks B1, and that the vertical center-to-center spacing between mask openings 251a corresponds to the vertical center-to-center spacing between the hologram blocks B1. The different cells of the hologram blocks B1 would be exposed by appropriately positioning the mask openings 251a over the cell position intended to be exposed in a particular exposure.

As to the construction of the hologram blocks B2, the exposure mask 51 in particular comprises the exposure mask 251, schematically illustrated in FIG. 7, as utilized for exposure of the cells of the hologram blocks B1. Such mask leaves uncovered each cell of each hologram block B2 that is in the same cell position, whereby all hologram cells located at the same location in all hologram blocks B2 are exposed at the same time. The different cells of the hologram blocks B2 would be exposed by appropriately positioning the mask openings 251a over the cell position intended to be exposed in a particular exposure.

The reference beam RB comprises a beam that is selected to emulate the shape of the intended playback beam (e.g., collimated, spherically diverging, cylindrically diverging, and so forth), while the object beam OB comprises a collimated beam. The incidence angle of the reference beam is selected to correspond to the incidence angle of the intended playback beam, while the incidence angle of the object beam OB is varied for each cell position as required to construct a hologram fringe pattern that will diffract light in the direction designated for that particular cell position.

The sizes of the hologram cells in the hologram blocks A and B are selected on the basis of factors including appearance, minimizing diffraction effects at the mask edges, ensuring that the luminous intensity requirements are met, and minimizing the number of hologram exposures required to construct a master hologram. By way of illustrative example, each of the cells PG of the primary hologram blocks A can be 0.083 inches wide and 0.072 inches high, and each of the cells SG1, SG2 of the secondary hologram blocks B can be 0.083 inches wide and 0.02 inches high.

It should be appreciated by persons skilled in the art that the foregoing exposure procedures are complex and time consuming, and that holograms made pursuant to such procedures can be readily utilized as master holograms for making copies pursuant to copy techniques known in the art.

The foregoing has been a disclosure of a holographic center high mounted stoplight system that advantageously has reduced spurious holograms and provides for precise control of the direction of the diffracted illumination.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic center high mounted stoplight system for a vehicle having a rear window, comprising
   a hologram layer having a plurality of single grating holograms formed therein, each single grating hologram configured to diffract light at a respective predetermined angle;
   a playback source that provides playback illumination having angular spread such that each single grating hologram diffracts light over a solid angular region;

a plurality of primary hologram blocks each including a plurality of single grating holograms arranged in an identical 2-dimensional array and diffracting light into respective solid angular regions within a central solid angular region, wherein the number of single grating holograms in each primary block is selected such that light diffracted by each primary hologram block is visible at all angular positions within the central angular range;

a plurality of first secondary hologram blocks each including a plurality of single grating holograms arranged in a 1 dimensional array and diffracting light into respective solid angular regions within a first peripheral angular region that is adjacent said central solid angular region, wherein the number of single grating holograms in each first secondary hologram block is selected such that light diffracted by each first secondary hologram block is visible at all angular positions within the first peripheral angular region; and a plurality of second secondary hologram blocks each including a plurality of single grating holograms arranged in a 1 dimensional array and diffracting light into respective solid angular regions within a second peripheral angular region which is adjacent said predetermined central solid angular region opposite said first peripheral angular region and a mirror image of said first peripheral angular region, wherein the number of single grating holograms in each second secondary hologram block is selected such that light diffracted by each second secondary hologram block is visible at all angular positions within the second peripheral angular region.

2. The hologram structure of claim 1 wherein said primary hologram blocks are arranged in rows, and wherein said first and second secondary hologram blocks are arranged in rows each including a plurality of first secondary hologram blocks interleaved with a plurality of second secondary hologram blocks.

3. The hologram structure of claim 2 wherein rows of primary hologram blocks are interleaved with rows of secondary hologram blocks.

4. The hologram structure of claim 1 wherein each hologram grating in each of the primary hologram blocks diffracts light at a different predetermined angle, each hologram grating in each of the first secondary hologram blocks diffracts light at a different predetermined angle, and each hologram grating in each of the second secondary hologram blocks diffracts light at a different predetermined angle.

5. A process for constructing a hologram for use in a holographic center high mounted stoplight system that includes a playback source having a predetermined angular spread, comprising the steps of:

organizing a layer of holographic recording material into primary hologram blocks, first secondary hologram blocks, and second secondary hologram blocks;

recording in each of the primary hologram blocks a plurality of single grating holograms configured to diffract light into respective solid angular regions within a central solid angular region, wherein such diffraction into an angular solid region is the result of the angular spread of the playback source, and wherein the number of single grating holograms in each primary block is selected pursuant to the angular spread of the playback source such that light diffracted by each primary block is visible at all angular positions within the central solid angular region;

recording in each of the first secondary hologram blocks a plurality of single grating holograms configured to diffract light into respective solid angular regions within a first peripheral angular region that is adjacent the central solid angular region, wherein such diffraction into an angular solid region is the result of the angular spread of the playback source, and wherein the number of single grating holograms in each first secondary block is selected pursuant to the angular spread of the playback source such that light diffracted by each first secondary block is visible at all angular positions within the first peripheral angular region; and recording in each of the second secondary hologram blocks a plurality of single grating holograms configured to diffract light into respective solid angular regions with a second peripheral angular region which is adjacent the central solid angular region opposite the first peripheral angular region and a mirror image of the first peripheral angular region, wherein such diffraction into an angular solid region is the result of the angular spread of the playback source, and wherein the number of single grating holograms in each first secondary block is selected pursuant to the angular spread of the playback source such that light diffracted by each second secondary block is visible at all angular positions within the second peripheral angular region.

6. The process of claim 5 wherein the primary hologram blocks are arranged in rows, and wherein first and second hologram blocks are arranged in rows each including a plurality of first secondary hologram blocks interleaved with a plurality of second secondary hologram blocks.

7. The process of claim 6 wherein rows of primary hologram blocks are interleaved with rows of first and second secondary hologram blocks.

8. The process of claim 7 wherein:

the step of recording the primary hologram blocks includes the step of simultaneously exposing all primary block holograms of a predetermined diffraction angle through a mask having openings corresponding to such holograms of a predetermined angle;

the step of recording the first secondary hologram blocks includes the step of simultaneously exposing all first secondary block holograms cells of a predetermined diffraction angle through a mask having openings corresponding to such holograms of a predetermined angle; and the step of recording the second secondary hologram blocks includes the step of simultaneously exposing all second secondary block holograms of a predetermined diffraction angle through a mask having openings corresponding to such holograms of a predetermined angle.

* * * * *